United States Patent [19]
Pastrick et al.

[11] Patent Number: 5,669,699
[45] Date of Patent: *Sep. 23, 1997

[54] EXTERIOR VEHICLE SECURITY LIGHT

[75] Inventors: Todd W. Pastrick, Grand Haven; Roger L. Veldman, Holland, both of Mich.

[73] Assignee: Donnelly Corporation, Holland, Mich.

[*] Notice: The term of this patent shall not extend beyond the expiration date of Pat. No. 5,371,659.

[21] Appl. No.: 585,393

[22] Filed: Jan. 8, 1996

Related U.S. Application Data

[63] Continuation-in-part of Ser. No. 426,591, Apr. 21, 1995, Pat. No. 5,497,306, which is a continuation-in-part of Ser. No. 333,412, Nov. 2, 1994, Pat. No. 5,497,305, which is a continuation of Ser. No. 11,947, Dec. 16, 1992, Pat. No. 5,371,659.

[51] Int. Cl.⁶ ......................................... B60Q 1/26
[52] U.S. Cl. ............................................ 362/83.1
[58] Field of Search .................................. 362/83.1

[56] References Cited

U.S. PATENT DOCUMENTS

| | | |
|---|---|---|
| 1,563,258 | 11/1925 | Cunningham . |
| 2,273,570 | 2/1942 | Greenlees . |
| 2,562,687 | 7/1951 | Anderson . |
| 3,596,079 | 7/1971 | Clark . |
| 4,041,301 | 8/1977 | Pelchat . |
| 4,205,325 | 5/1980 | Haygood et al. . |
| 4,258,352 | 3/1981 | Lipschutz . |
| 4,274,078 | 6/1981 | Isobe et al. . |
| 4,342,210 | 8/1982 | Denningham . |
| 4,446,380 | 5/1984 | Moriya et al. . |
| 4,475,100 | 10/1984 | Duh . |
| 4,688,036 | 8/1987 | Hirano et al. . |
| 4,809,137 | 2/1989 | Yamada . |
| 4,866,417 | 9/1989 | DeFino et al. . |
| 4,881,148 | 11/1989 | Lambropoulos et al. . |
| 4,890,907 | 1/1990 | Vu et al. . |
| 4,916,430 | 4/1990 | Vu et al. . |
| 5,014,167 | 5/1991 | Roberts . |
| 5,017,903 | 5/1991 | Krippelz, Sr. . |
| 5,038,255 | 8/1991 | Nishihashi et al. . |
| 5,049,867 | 9/1991 | Stouffer . |
| 5,109,214 | 4/1992 | Heidman, Jr. . |
| 5,113,182 | 5/1992 | Suman et al. . |
| 5,132,882 | 7/1992 | Alder . |
| 5,151,824 | 9/1992 | O'Farrell . |
| 5,179,471 | 1/1993 | Caskey et al. . |
| 5,207,492 | 5/1993 | Roberts . |
| 5,303,130 | 4/1994 | Wei et al. ............................... 362/83.1 |
| 5,313,335 | 5/1994 | Gray et al. . |
| 5,371,659 | 12/1994 | Pastrick et al. . |
| 5,497,305 | 3/1996 | Pastrick et al. ........................ 362/83.1 |
| 5,497,306 | 3/1996 | Pastrick . |

FOREIGN PATENT DOCUMENTS

| | | |
|---|---|---|
| 3635473A1 | 4/1988 | Germany . |
| 3635471A1 | 5/1988 | Germany . |
| 3803510 | 9/1988 | Germany . |
| 0188242 | 8/1986 | Japan . |
| 0218248 | 9/1987 | Japan . |
| 0239273 | 9/1989 | Japan . |

*Primary Examiner*—Carroll B. Dority
*Attorney, Agent, or Firm*—Van Dyke, Gardner, Linn & Burkhart, LLP

[57] ABSTRACT

A mirror assembly security system for a vehicle includes an exterior mirror assembly and having a reflective element and a housing for the reflective element. A security light made up of at least one light-emitting diode projects light from the housing on an area adjacent the vehicle to create a lighted security zone in the area. An actuator is provided for the security light. The security light may be a plurality of light-emitting diodes either each positioned in its own aperture in the housing, or arranged as an array of LEDs in a common aperture. A lens may be provided covering the aperture.

92 Claims, 6 Drawing Sheets

EXTERIOR VEHICLE SECURITY LIGHT

RELATED APPLICATIONS

This application is a continuation-in-part of application Ser. No. 08/426,591, filed Apr. 21, 1995, now U.S. Pat. No. 5,497,306, which is a continuation-in-part of application Ser. No. 08/333,412 filed Nov. 2, 1994, now U.S. Pat. No. 5,497,305, which is a continuation of application Ser. No. 08/011,947 filed Dec. 16, 1992, now U.S. Pat. No. 5,371,659.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

SUMMARY OF THE INVENTION

The present invention is intended to provide a personal safety feature for a vehicle in the form of a light adapted to projecting light generally downwardly on an area adjacent a portion of the vehicle in order to create a lighted security zone in the area. According to the invention, a mirror assembly security system for a vehicle includes an exterior mirror assembly including a reflective element and a housing for the reflective element. A security light made up of at least one light-emitting diode projects light from the housing on at least an area adjacent a portion of the vehicle. This creates a lighted security zone in the area. An actuator is provided for the security light. The actuator includes a base unit in the vehicle and a remote transmitter. The base unit is responsive to a signal from the remote transmitter in order to actuate the first security light.

According to another aspect of the invention, the mirror housing is defined in part by a lower wall portion. The security light is made up of a plurality of light-emitting diodes which project light generally downwardly from the lower wall portion on an area adjacent a portion of the vehicle in order to create the lighted security zone. An actuator for the security light includes a base unit in the vehicle and either a remote transmitter or a proximity detector unit, or both. The base unit is responsive to a signal from the remote transmitter, the proximity detection unit or either the remote transmitter or the proximity detection unit in order to actuate the security light. Each light-emitting diode in the plurality of light-emitting diodes may be individually positioned in an associated aperture in the lower wall portion of the housing or may be incorporated such as by integral molding into the wall of the housing. Alternatively, the light-emitting diodes may be positioned as an array of diodes in an aperture in the lower wall portion of the housing. A lens may be positioned over the aperture. The lens may be a clear lens, a Fresnal lens, a binary optic, a reflective optic, a holographic optic, or a diffusing optic.

The security system is adapted to projecting a pattern of light from the exterior mirror housing on an area adjacent a portion of the vehicle that extends laterally onto the vehicle and downwardly and rearwardly of the vehicle. In this manner, a security zone is established in the vicinity of the vehicle doors where occupants enter and exit the vehicle.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. Utilizing light-emitting diodes for the security light provides a well-defined light pattern, such as a cone of directed light which reduces or eliminates the need for reflectors or other separate optic components to direct the light to the desired area. Additionally, light-emitting diodes generate low heat while having an extremely long and durable life which typically outlasts the operation life of the mirror assembly and the vehicle on which it is mounted. The small size of light-emitting diodes allows an array of light-emitting diodes to be readily positioned within the confined spaces of the mirror assembly. Furthermore, because of their durability, light sources require little or no maintenance or repair which may eliminate concerns of access after the mirror assembly is manufactured. Also, individual, or groups of, light-emitting diodes can be oriented so as to direct their light output to specific localized regions adjacent the vehicle or can be located in regions of the housing other than the lower portion.

These and other objects, advantages and features of this invention will become apparent upon review of the following specification in conjunction with the drawings.

DESCRIPTION OF THE PREFERRED EMBODIMENT

Referring now specifically to the drawings, and the illustrative embodiments depicted therein, a vehicle personal security lighting system 25 includes an exterior mirror assembly 26 having a conventional reflectance element 28 and a security light 30. If desired, lighting system 25 may further include a signal light (not shown) incorporated in housing, or casing, 34 as disclosed in U.S. Pat. No. 5,371, 659, the disclosure of which is hereby incorporated herein by reference. Casing 34 is connected by a neck 36 to a stationary panel or sail 38 adapted for incorporation with the forward portion of the vehicle side window assembly, and which mounts mirror assembly 26 to the door of a vehicle 40. Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

Figure 5:
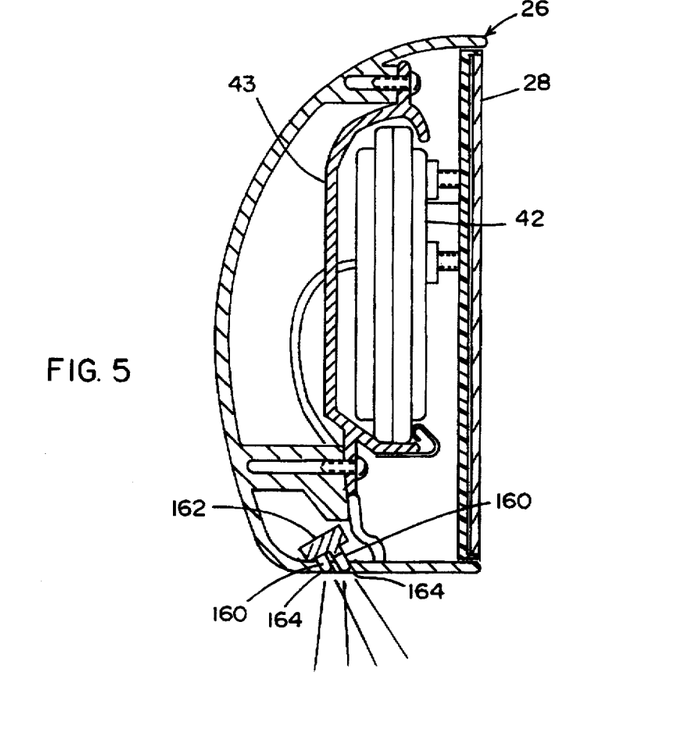
FIG. 5 is a sectional view taken along the lines V—V in FIG. 4.
Figure 6:
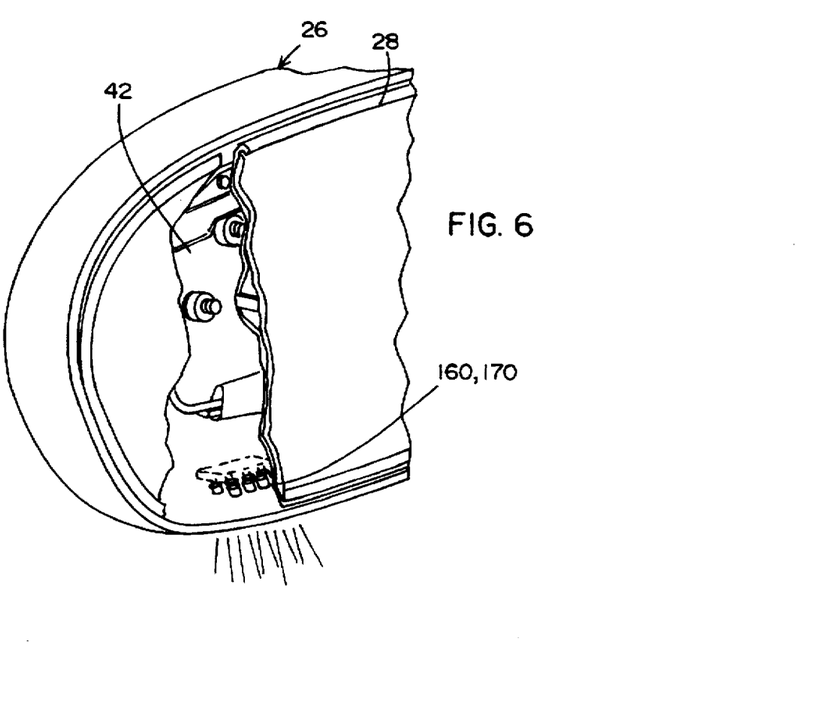
FIG. 6 is the same view as FIG. 1 with a portion of the structure removed to reveal internal structures thereof.
Figure 8:
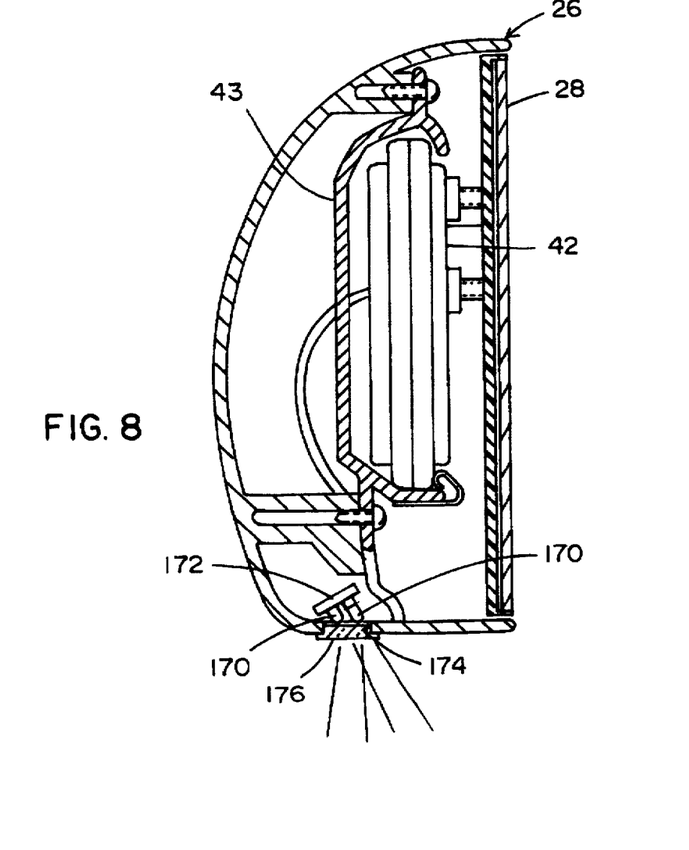
FIG. 8 is a sectional view taken along the lines VIII—VIII in FIG. 7.

With reference to FIGS. 5 and 8, as is conventional, reflectance element 28 is mounted to a bracket 43 by a positioning device such as an actuator 42. Casing 34 is mounted to bracket 43. Actuator 42 provides remote positioning of reflectance element 28 on two orthogonal axes. Such actuators are well known in the art and may include a jackscrew-type actuator such as Model No. H16-49-8001 (right-hand mirror) and Model No. H16-49-8051 (left-hand mirror) by Matsuyama of Kawagoe City, Japan, or a planetary-gear actuator such as Model No. 540 (U.S. Pat. No. 4,281,899) sold by Industrie Koot BV (IKU) of Montfoort, Netherlands. As is also conventional, the entire casing 34 including actuator 42 is mounted via a bracket for breakaway motion with respect to stationary panel 38 by a breakaway joint assembly as is further disclosed in U.S. Pat. No. 5,371,659.

Figure 12:
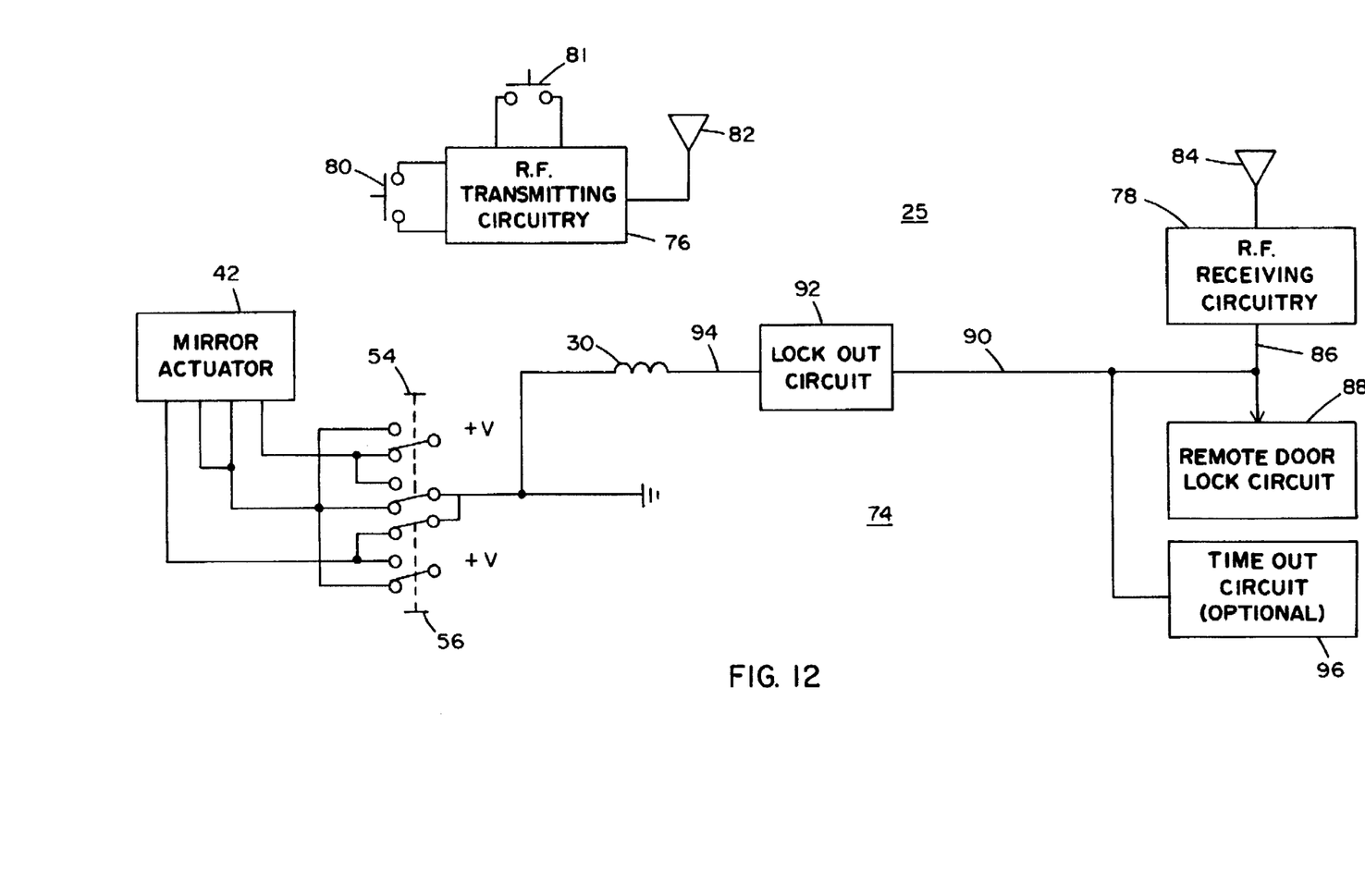
FIG. 12 is a block diagram of a control system according to the invention.

With reference to FIG. 12, actuator 42 receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Figure 1:
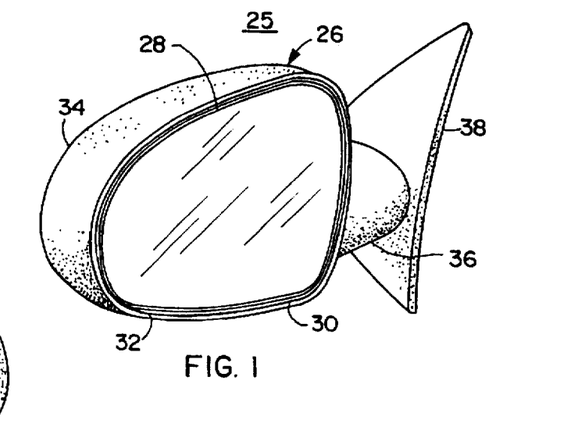
FIG. 1 is a perspective view taken from the front of a mirror assembly (rear of the vehicle) incorporating the invention.
Figure 2:
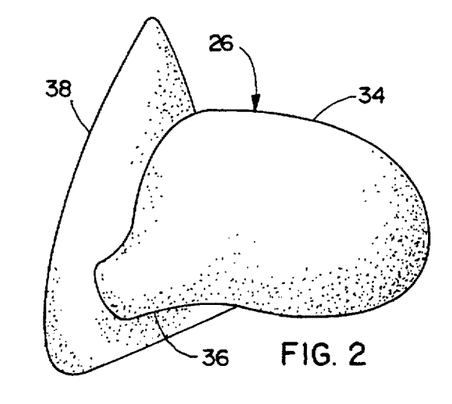
FIG. 2 is a rear view of the mirror assembly in FIG. 1.
Figure 3:
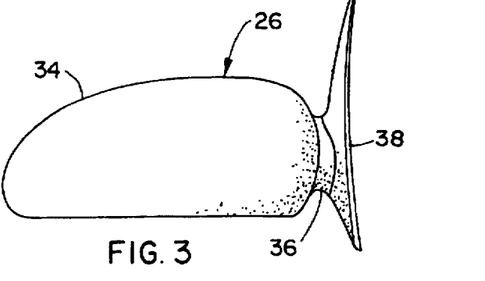
FIG. 3 is a top view of the mirror assembly in FIG. 1.
Figure 4:
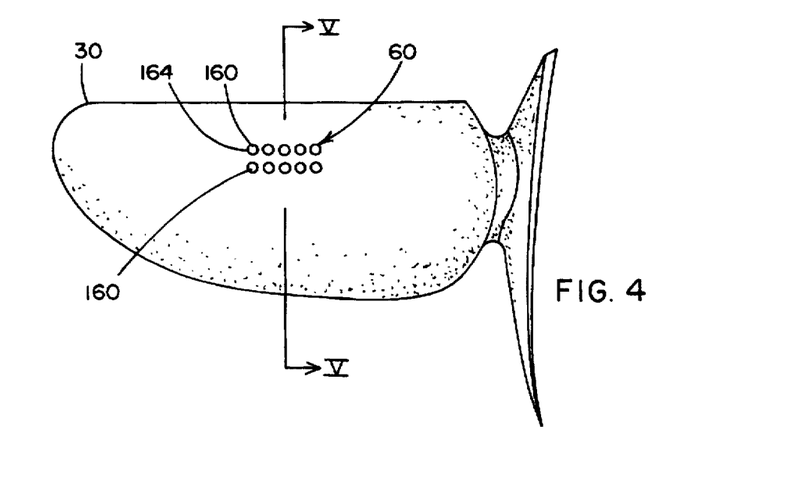
FIG. 4 is a bottom view of the mirror assembly in FIG. 1.
Figure 7:
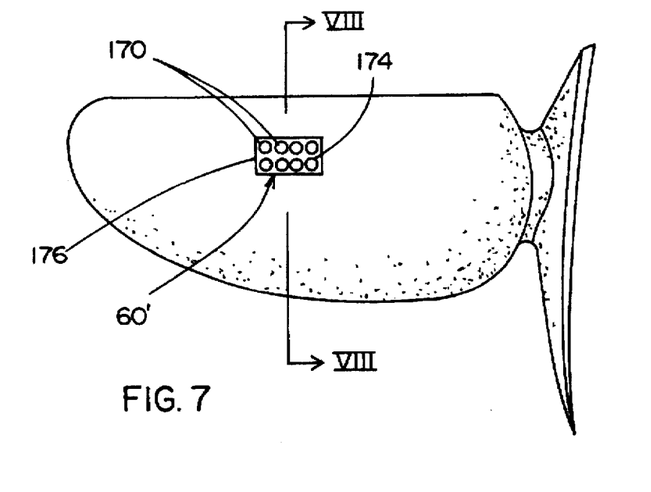
FIG. 7 is a bottom view of an alternative embodiment of the invention.
Figures 9, 10:
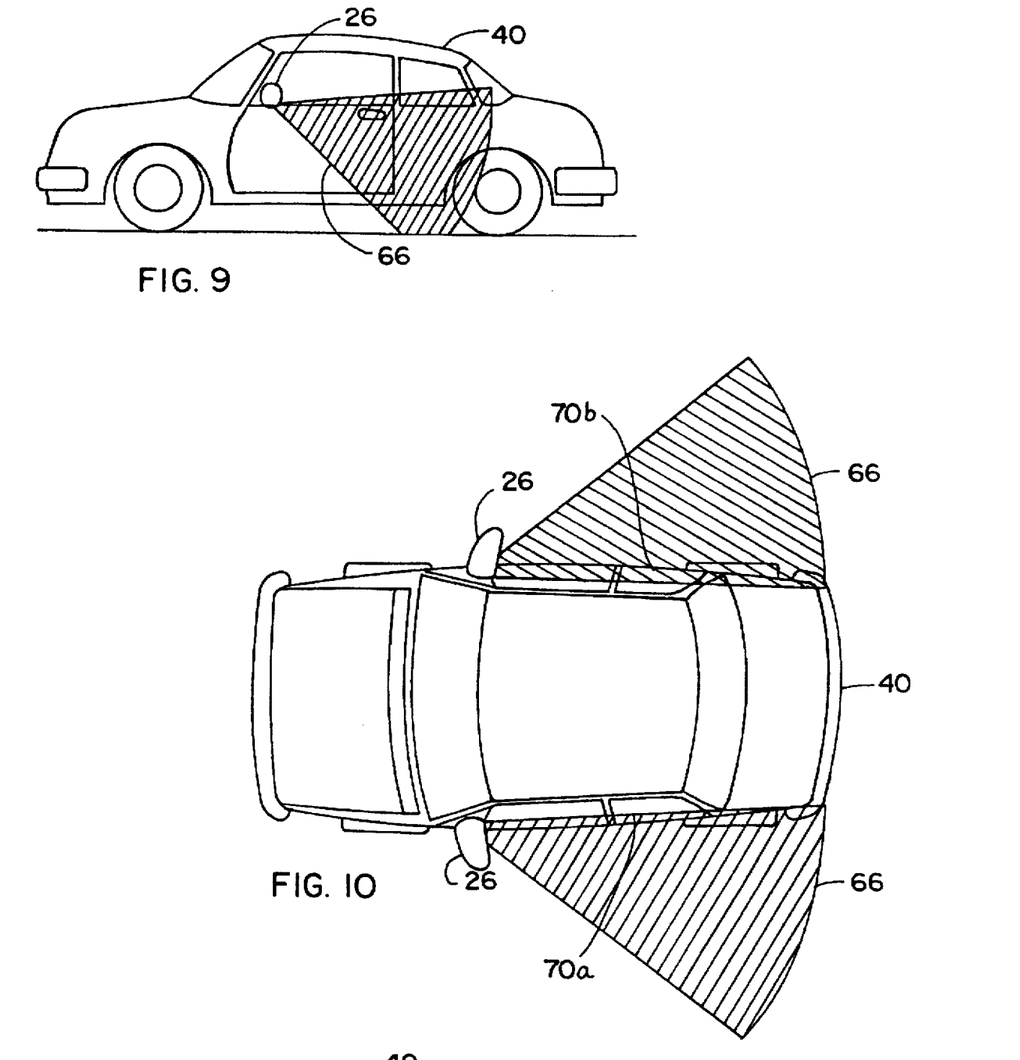
FIG. 9 is a side elevation of a vehicle illustrating the security zone light pattern generated by a security light according to the invention.
FIG. 10 is a top plan view of the vehicle and light pattern in FIG. 9.
Figure 11:
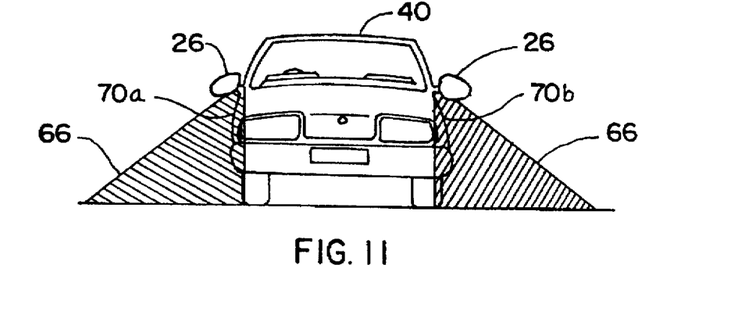
FIG. 11 is a rear elevation of the vehicle and light pattern in FIG. 10.

Security light 30 includes a light source 60, 60' (FIGS. 4 and 7). Security light 30 projects a pattern 66 of light in order to establish a security zone around the vehicle (FIGS. 9–11). Pattern 66 extends rearward from mirror assembly 26. Vertically, pattern 66 contacts the ground at 68 in the vicinity of entry and exit by the vehicle occupants (FIGS. 9 and 11). Laterally, pattern 66 fans out into contact with the side 70a, 70b of the vehicle. This contact washes the sides of the vehicle to reflect the light in order to further illuminate the area in order to establish the security lighting zone (FIGS. 10 and 11). In a preferred embodiment, pattern 66 extends rearwardly from mirror assembly 26 without projecting any portion of the pattern forwardly of the mirror assembly.

Vehicle mirror assembly security system 25 is actuated by a control system 74 (FIG. 12). Control system 74 includes means for actuating LED security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, interior cabin, or within or on a mirror assembly, and includes an output 86 in order to operate remote door lock circuit 88, as is conventional. For example, an antenna, such as a metallic antenna comprising, for example, 6 to 20 gauge copper wire, and/or an RF, IR, and the like signal receiving circuit, may be incorporated into one, and preferably both, of the exterior mirror assemblies, or into the interior mirror assembly, or into vehicle glazing, trim items such as sunvisors and overhead consoles, and their like. Such an antenna can be auxiliary mounted, integrally mounted, or insert molded into or onto, for example, the exterior mirror bracket, sail, housing, bezel, or visor, or could be part of the light module. Actuation of the lamp may also be accomplished by sensing the proximity of the approaching owner. Such receiving system can be of the automatic, proximity detection type that automatically senses proximity and approach of the vehicle owner by its automatic detection of the transducer carried by the vehicle owner, without that vehicle owner having necessarily to operate a button on a hand-held unit. Also, the receiver may be part of, or itself be, a proximity detection system that activates and illuminates the light module of this invention whenever the vehicle is approached under conditions where vehicle security is being detected and protected.

Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. The lockout circuit may also be included in the vehicle's ignition system, such that the security light is disabled when the engine is started and the vehicle is operating. Thus, the lamp will be off when the ignition switch is turned to start the engine. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors.

In the illustrated embodiment, light source 60, 60' for security light 30 may be supplied as one or more light-emitting diodes 160, 170. Light-emitting diodes 160 are mounted to a circuit board 162, which is positioned within housing 34 (FIGS. 4 and 5). Each light-emitting diode (LED) in the plurality of LEDs 160 is positioned within a separate aperture 164 in the lower portion of housing 36. In the illustrated embodiment, each light-emitting emitting diode in the plurality of LEDs 160 provides a cone of directed light. Therefore, the plurality of LEDs 160 generates a combined beam of light which is directed generally downwardly on an area adjacent the vehicle.

Alternatively, light-emitting diodes 170 may be arranged in an array on a circuit board 172 with the entire array positioned within housing 34 behind a common opening 174 in the housing (FIGS. 7 and 8). Aperture 174 may be covered by a lens 176. Lens 176 could be any of a clear lens, a Fresnal lens, a binary optic, a refractive optic, a holographic optic, or a diffusing optic. In a preferred embodiment, lens 176 is made from a plastic material.

Each light-emitting diode in the plurality of LEDs 160, 170 has a cross-sectional area that is less than approximately 4 $cm^2$ and preferably less than approximately 1 $cm^2$. This allows the plurality of diodes to be positioned within the confined spaces of the mirror assembly. In the illustrated embodiment, diodes 160, 170 are Model HLMT-CL15diodes marketed by Hewlett Packard. In the illustrated embodiment, each light-emitting diode in the plurality of LEDs 160, 170 has a cross-sectional area of approximately 0.3 $cm^2$ and generates a 15° cone of light. The light has a dominant amber color comprised of a dominant wavelength of approximately 590 nm at a luminous intensity of approximately 4,000 millicandela (mcd). A variety of light-emitting sources are available utilizing double heterojunction AlGaAs/GaAs material technology, such as very high intensity red LED lamps T-1¾ (5 mm) HLMP-4100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under the designation T-1¾ (5 mm) HLMT-DL00, HLMT-CH00, HLMT-CL00, HLMT-CH15, HLMT-CL15 and HLMT-DH00 or which use InGaAlP material technology available from Toshiba Corporation of Latham, N.Y., such as under the designation TLRH180D. Light emitrance colors provided by such solid-state sources include orange, yellow, amber, red, and reddish-orange, desirably without need of ancillary spectral filters. The preferred solid-state light-emitting diodes, at 25° C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typically, about 700 to about 7000 mcd); operate at a forward current of about 20 mA to about 50 mA; emit with a dominant wavelength (CIE Chromaticity Diagram) of about 530 nm to about 680 nm; and have a viewing angle $2\Theta_{1/2}$ (where $\Theta_{1/2}$ is the off-axis angle where the luminous intensity is one half the peak intensity) of about 5° to about 25°.

Preferably, LEDs 160, 170 comprise at least four individual light-emitting diodes, more preferably at least six, most preferably at least eight. Also, when incorporated into an exterior mirror housing and mounted on a typical automobile, the LED security light is approximately 30±5 inches from the ground surface, and, when operated at about 12 volts, the security light preferably illuminates a portion of the ground adjacent the vehicle with a light intensity of at least about five (5) lux; more preferably, at least about ten (10) lux.

Figure 13:
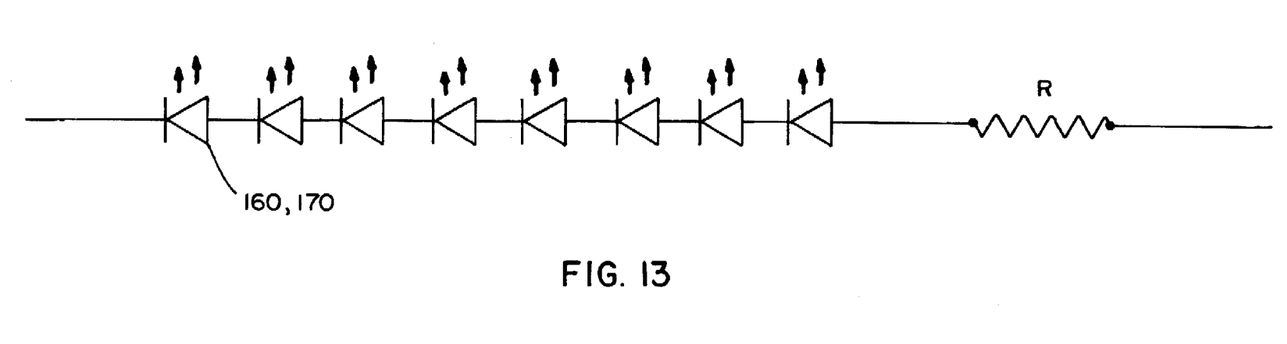
FIG. 13 is a schematic diagram of an electrical circuit for supplying power to a plurality of light-emitting diodes.
Figure 14:
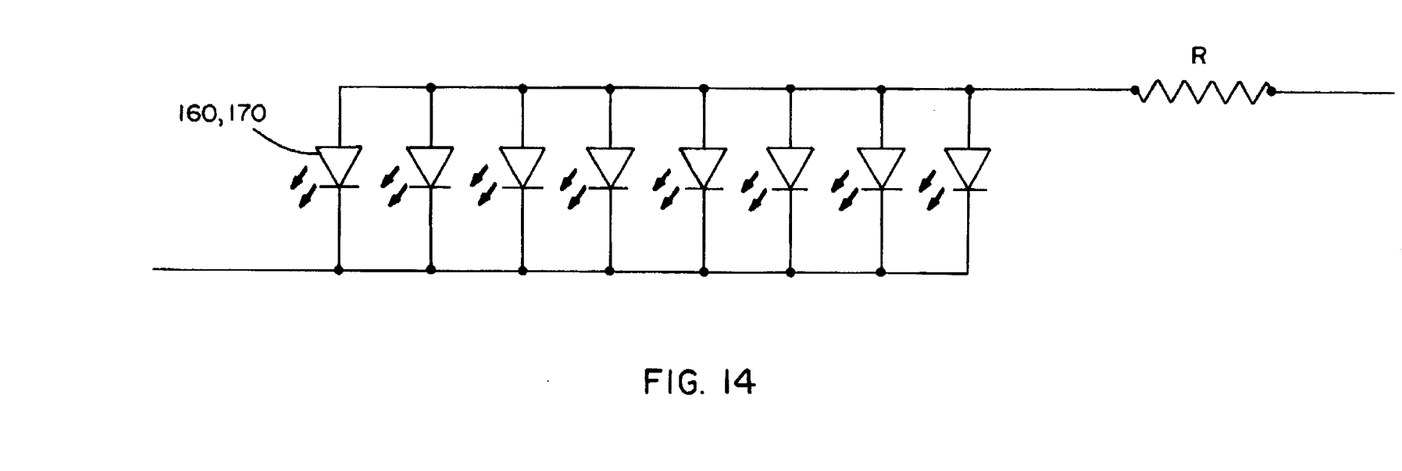
FIG. 14 is the same view as FIG. 13 of an alternative embodiment.

Light-emitting diodes 160, 170 may be connected in electrical series with a resistor R as illustrated in FIG. 13. Alternatively, the LED array can be connected in a parallel network which, in turn, is connected in series with a resistor R. In either parallel or series arrangements, resistor R is a voltage divider to reduce battery/ignition voltage from the vehicle. Such voltage from the ignition/battery of the vehicle is in the range of approximately 9 to 16 volts, with a nominal 12 volts. Resistor R reduces the voltage to the operating voltage of each LED, which is in the range of approximately 1 volt to 5 volts. Preferably, resistor R is less than about 1500 ohms and greater than about 100 ohms in resistance. More preferably, resistor R is less than 1000 ohms and greater than 200 ohms. Additionally, a diode (not shown) may be connected in series with either circuit to protect the LED array from an unintended reverse voltage connection.

Although a dominant amber color is preferred, other colors may be utilized including green, orange, yellow, red and blue. The color obtained depends upon the elemental composition of the selected diode.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A mirror assembly security system for a vehicle, comprising:

a first exterior mirror assembly including a first reflective element and a first housing for said first reflective element;

a first security light comprising at least one light-emitting diode projecting light from said first housing on at least a first area adjacent a first portion of the vehicle in order to create a first lighted security zone in said first area; and an actuator for said first security light including a base unit in the vehicle and a remote transmitter, wherein said base unit is responsive to a signal from said remote transmitter in order to actuate said first security light.

2. The mirror assembly security system of claim 1 wherein said first exterior mirror assembly is a driver-side exterior mirror assembly.

3. The mirror assembly security system of claim 1 wherein said first exterior mirror assembly is a passenger-side exterior mirror assembly.

4. The mirror assembly security system of claim 2 further including a second exterior mirror assembly having a second reflective element and a second housing for said second reflective element, and a second security light comprising at least one light-emitting diode projecting light from said second housing on at least a second area adjacent a second portion of the vehicle in order to create a second lighted security zone in said second area, said second exterior mirror assembly being a passenger-side exterior mirror assembly, and said second security light also being responsive to actuation of said actuator.

5. The mirror assembly security system of claim 4 wherein actuation of said first security light and said second security light occurs simultaneously.

6. The mirror assembly security system of claim 4 wherein said first security light projects light generally downwardly from said first housing, and said second security light projects light generally downwardly from said second housing.

7. The mirror assembly security system of claim 6 wherein said first area is at least adjacent the driver front entrance to the vehicle and said second area is at least adjacent the passenger front entrance to the vehicle.

8. The mirror assembly security system of claim 7 wherein said first security light generates a first pattern of light through a non-filtering lens and said second security light generates a second pattern of light through a non-filtering lens.

9. The mirror assembly security system of claim 2 wherein said first reflective element is an electro-optic mirror.

10. The mirror assembly security system of claim 9 wherein said electro-optic mirror is an electrochromic mirror.

11. The mirror assembly security system of claim 10 wherein said electrochromic mirror is an electrochemichromic mirror.

12. The mirror assembly security system of claim 4 wherein each of said first reflective element and said second reflective element is an electro-optic mirror.

13. The mirror assembly security system of claim 12 wherein said electro-optic mirror is an electrochromic mirror.

14. The mirror assembly security system of claim 13 wherein said electrochromic mirror is an electrochemichromic mirror.

15. A mirror assembly security system for a vehicle, comprising:

a first exterior mirror assembly including a first reflective element and a first housing for said first reflective element, said first housing defined in part by a first lower wall portion;

a first security light comprising a first plurality of light-emitting diodes projecting light generally downwardly from said first lower wall portion on at least a first area adjacent a first portion of the vehicle in order to create a first lighted security zone in said first area; and an actuator for said first security light including a base unit in the vehicle and a remote transmitter, wherein said base unit is responsive to a signal from said remote transmitter in order to actuate said first security light.

16. The mirror assembly security system in claim 15 wherein said first exterior mirror assembly is a driver-side exterior mirror assembly.

17. The mirror assembly security system in claim 15 wherein said first exterior mirror assembly is a passenger-side exterior mirror assembly.

18. The mirror assembly security system in claim 16 further including a second exterior mirror assembly having a second reflective element and a second housing for said second reflective element defined in part by a second lower wall portion and a second security light comprising a second plurality of light-emitting diodes projecting light generally downwardly from said second lower wall portion on at least a second area adjacent a second portion of the vehicle in order to create a second lighted security zone in said second area, said second exterior mirror assembly being a passenger-side exterior mirror assembly, and said second security light also being responsive to actuation of said actuator.

19. The mirror assembly security system of claim 18 wherein actuation of said first security light and said second security light occurs simultaneously.

20. The mirror assembly security system of claim 18 wherein said first area is at least adjacent the driver front entrance to the vehicle and said second area is at least adjacent the passenger front entrance to the vehicle.

21. The mirror assembly security system of claim 20 wherein said first security light generates a first pattern of light through a non-filtering lens and said second security light generates a second pattern of light through a non-filtering lens.

22. The mirror assembly security system of claim 16 wherein said first reflective element is an electro-optic mirror.

23. The mirror assembly security system of claim 22 wherein said electro-optic mirror is an electrochromic mirror.

24. The mirror assembly security system of claim 23 wherein said electrochromic mirror is an electrochemichromic mirror.

25. The mirror assembly security system of claim 18 wherein each of said first reflective element and said second reflective element is an electro-optic mirror.

26. The mirror assembly security system of claim 25 wherein said electro-optic mirror is an electrochromic mirror.

27. The mirror assembly security system of claim 26 wherein said electrochromic mirror is an electrochemichromic mirror.

28. The mirror assembly security system in claim 16 wherein each of said light-emitting diodes is positioned in an associated aperture in said first lower wall portion.

29. The mirror assembly security system in claim 16 wherein said light-emitting diodes are positioned as an array in an aperture in said first lower wall portion.

30. The mirror assembly security system in claim 29 including a lens over said aperture.

31. The mirror assembly security system in claim 30 wherein said lens is one of a clear lens, a Fresnal lens, a binary optic, a reflective optic, a holographic optic, or a diffusing optic.

32. The mirror assembly security system in claim 30 wherein said lens is made from plastic.

33. The mirror assembly security system in claim 28 wherein each of said light-emitting diodes has a cross-sectional area of less than approximately 4 cm$^2$.

34. The mirror assembly security system in claim 33 wherein each of said light-emitting diodes has a cross-sectional area of less than approximately 1 cm$^2$.

35. The mirror assembly security system in claim 29 wherein each of said light-emitting diodes has a cross-sectional area of less than approximately 4 cm$^2$.

36. The mirror assembly security system in claim 35 wherein each of said light-emitting diodes has a cross-sectional area of less than approximately 1 cm$^2$.

37. The mirror assembly security system in claim 28 wherein each of said light-emitting diodes has a dominant wavelength of approximately 590 nanometers.

38. The mirror assembly security system in claim 29 wherein each of said light-emitting diodes has a dominant wavelength of approximately 590 nanometers.

39. The mirror assembly security system in claim 28 wherein said light-emitting diodes are electrically connected in series.

40. The mirror assembly security system in claim 29 wherein said light-emitting diodes are electrically connected in series.

41. The mirror assembly security system in claim 28 wherein said light-emitting diodes are electrically connected in parallel.

42. The mirror assembly security system in claim 29 wherein said light-emitting diodes are electrically connected in parallel.

43. A mirror assembly security system for a vehicle, comprising:

a first exterior mirror assembly including a first reflective element and a first opaque housing for said first reflective element, said first housing being fixedly mounted relative to said vehicle and defined in part by a first lower wall portion and means for movably mounting said reflective element relative to said housing to face in a direction rearwardly of said vehicle; and a first security light comprising a first plurality of at least four light-emitting diodes projecting a first pattern of light downwardly and rearwardly from said first lower wall portion on at least a first area adjacent a first portion of the vehicle in order to create a first lighted security zone in said first area illuminated to a light intensity of at least approximately five lux.

44. The mirror assembly security system in claim 43 wherein said first exterior mirror assembly is a driver-side exterior mirror assembly.

45. The mirror assembly security system in claim 43 wherein said first exterior mirror assembly is a passenger-side exterior mirror assembly.

46. The mirror assembly security system in claim 44 further including a second exterior mirror assembly having a second reflective element and a second housing for said second reflective element defined in part by a second lower wall portion and a second security light comprising a second plurality of at least four light-emitting diodes projecting light generally downwardly from said second lower wall portion on at least a second area adjacent a second portion of the vehicle in order to create a second lighted security zone in said second area, said second exterior mirror assembly being a passenger-side exterior mirror assembly.

47. The mirror assembly security system of claim 46 wherein said first area is at least adjacent the driver front entrance to the vehicle and said second area is at least adjacent the passenger front entrance to the vehicle.

48. The mirror assembly security system of claim 47 wherein said first security light generates a first pattern of light through a non-filtering lens and said second security light generates a second pattern of light through a non-filtering lens.

49. The mirror assembly security system of claim 44 wherein said first reflective element is an electro-optic mirror.

50. The mirror assembly security system of claim 49 wherein said electro-optic mirror is an electrochromic mirror.

51. The mirror assembly security system of claim 50 wherein said electrochromic mirror is an electrochemichromic mirror.

52. The mirror assembly security system of claim 46 wherein each of said first reflective element and said second reflective element is an electro-optic mirror.

53. The mirror assembly security system of claim 52 wherein said electro-optic mirror is an electrochromic mirror.

54. The mirror assembly security system of claim 53 wherein said electrochromic mirror is an electrochemichromic mirror.

55. The mirror assembly security system in claim 43 including a lens over said light-emitting diodes.

56. The mirror assembly security system in claim 55 wherein said lens is one of a clear lens, a Fresnal lens, a binary optic, a reflective optic, a holographic optic, or a diffusing optic.

57. The mirror assembly security system in claim 55 wherein said lens is made from plastic.

58. The mirror assembly security system in claim 43 wherein each of said light-emitting diodes has a cross-sectional area of less than approximately 4 cm².

59. The mirror assembly security system in claim 58 wherein each of said light-emitting diodes has a cross-sectional area of less than approximately 1 cm².

60. The mirror assembly security system in claim 43 wherein each of said light-emitting diodes has a dominant wavelength of approximately 590 nanometers.

61. The mirror assembly security system in claim 43 wherein said light-emitting diodes are electrically connected in series.

62. The mirror assembly security system in claim 43 wherein said light-emitting diodes are electrically connected in parallel.

63. The mirror assembly security system in claim 43 wherein said first security light comprises a first array of at least six light-emitting diodes.

64. The mirror assembly security system in claim 63 wherein said first security light comprises a first array of at least eight light-emitting diodes.

65. A mirror assembly security system for a vehicle, comprising:

a first exterior mirror assembly including a first reflective element and a first housing for said first reflective element, said first housing defined in part by a first lower wall portion;

a first security light comprising a first plurality of light-emitting diodes projecting light generally downwardly from said first lower wall portion on at least a first area adjacent a first portion of the vehicle in order to create a first lighted security zone in said first area; and an actuator for said first security light which actuates said first security light in response to approach of an individual to the vehicle.

66. The mirror assembly security system in claim 65 wherein said first exterior mirror assembly is a driver-side exterior mirror assembly.

67. The mirror assembly security system in claim 65 wherein said first exterior mirror assembly is a passenger-side exterior mirror assembly.

68. The mirror assembly security system in claim 66 further including a second exterior mirror assembly having a second reflective element and a second housing for said second reflective element defined in part by a second lower wall portion and a second security light comprising a second plurality of light-emitting diodes projecting light generally downwardly from said second lower wall portion on at least a second area adjacent a second portion of the vehicle in order to create a second lighted security zone in said second area, said second exterior mirror assembly being a passenger-side exterior mirror assembly, and said second security light also being responsive to actuation of said actuator.

69. The mirror assembly security system of claim 68 wherein actuation of said first security light and said second security light occurs simultaneously.

70. The mirror assembly security system of claim 68 wherein said first area is at least adjacent the driver front entrance to the vehicle and said second area is at least adjacent the passenger front entrance to the vehicle.

71. The mirror assembly security system of claim 70 wherein said first security light generates a first pattern of light through a non-filtering lens and said second security light generates a second pattern of light through a non-filtering lens.

72. The mirror assembly security system of claim 66 wherein said first reflective element is an electro-optic mirror.

73. The mirror assembly security system of claim 72 wherein said electro-optic mirror is an electrochromic mirror.

74. The mirror assembly security system of claim 73 wherein said electrochromic mirror is an electrochemichromic mirror.

75. The mirror assembly security system of claim 68 wherein each of said first reflective element and said second reflective element is an electro-optic mirror.

76. The mirror assembly security system of claim 75 wherein said electro-optic mirror is an electrochromic mirror.

77. The mirror assembly security system of claim 76 wherein said electrochromic mirror is an electrochemichromic mirror.

78. The mirror assembly security system in claim 66 wherein each of said light-emitting diodes is positioned in an associated aperture in said first lower wall portion.

79. The mirror assembly security system in claim 66 wherein said light-emitting diodes are positioned as an array in an aperture in said first lower wall portion.

80. The mirror assembly security system in claim 79 including a lens over said aperture.

81. The mirror assembly security system in claim 80 wherein said lens is one of a clear lens, a Fresnal lens, a binary optic, a reflective optic, a holographic optic, or a diffusing optic.

82. The mirror assembly security system in claim 80 wherein said lens is made from plastic.

83. The mirror assembly security system in claim 78 wherein each of said light-emitting diodes has a cross-sectional area of less than approximately 4 $cm^2$.

84. The mirror assembly security system in claim 83 wherein each of said light-emitting diodes has a cross-sectional area of less than approximately 1 $cm^2$.

85. The mirror assembly security system in claim 79 wherein each of said light-emitting diodes has a cross-sectional area of less than approximately 4 $cm^2$.

86. The mirror assembly security system in claim 85 wherein each of said light-emitting diodes has a cross-sectional area of less than approximately 1 $cm^2$.

87. The mirror assembly security system in claim 78 wherein each of said light-emitting diodes has a dominant wavelength of approximately 590 nanometers.

88. The mirror assembly security system in claim 79 wherein each of said light-emitting diodes has a dominant wavelength of approximately 590 nanometers.

89. The mirror assembly security system in claim 78 wherein said light-emitting diodes are electrically connected in series.

90. The mirror assembly security system in claim 79 wherein said light-emitting diodes are electrically connected in series.

91. The mirror assembly security system in claim 78 wherein said light-emitting diodes are electrically connected in parallel.

92. The mirror assembly security system in claim 79 wherein said light-emitting diodes are electrically connected in parallel.

* * * * *

UNITED STATES PATENT AND TRADEMARK OFFICE
CERTIFICATE OF CORRECTION

PATENT NO. : 5,669,699
DATED : September 23, 1997
INVENTOR(S) : Todd W. Pastrick and Roger L. Veldman It is certified that error appears in the above-indentified patent and that said Letters Patent is hereby corrected as shown below:

Column 5, line 37:
"emitrance" should be --emittance--.

Column 8, line 38, claim 33:
"m" should be --in--.

Signed and Sealed this

Twenty-eighth Day of September, 1999

Attest:

Q. TODD DICKINSON

*Attesting Officer*  *Acting Commissioner of Patents and Trademarks*